US012607334B1

(12) United States Patent
Long

(10) Patent No.: US 12,607,334 B1
(45) Date of Patent: Apr. 21, 2026

(54) ADJUSTABLE ANGLE SPOTLIGHT STRUCTURE

(71) Applicant: Dongguan KJH Lights Co., LTD, Dongguan (CN)

(72) Inventor: Hu Long, Shenzhen (CN)

(73) Assignee: Dongguan KJH Lights Co., LTD, Dongguan (CN)

( * ) Notice: Subject to any disclaimer, the term of this patent is extended or adjusted under 35 U.S.C. 154(b) by 0 days.

(21) Appl. No.: 19/187,453

(22) Filed: Apr. 23, 2025

(51) Int. Cl.
*F21V 21/30* (2006.01)
*F21V 14/06* (2006.01)

(52) U.S. Cl.
CPC .............. *F21V 21/30* (2013.01); *F21V 14/06* (2013.01)

(58) Field of Classification Search
CPC .. F21V 21/046; F21V 21/044; F21V 19/0045; F21V 19/004; F21V 14/06
See application file for complete search history.

(56) References Cited

U.S. PATENT DOCUMENTS

2024/0255131 A1* 8/2024 Yu ........................... F21V 17/12

FOREIGN PATENT DOCUMENTS

| | | | | |
|---|---|---|---|---|
| AT | 515371 A2 * | 8/2015 | | .............. F21V 14/06 |
| CN | 118129109 A * | 6/2024 | | ........... H05B 45/325 |
| CN | 222925383 U * | 5/2025 | | |

OTHER PUBLICATIONS

Innovation Q+NPL Search (Year: 2025).*

* cited by examiner

*Primary Examiner* — Anabel Ton
(74) *Attorney, Agent, or Firm* — Birchwood IP

(57) ABSTRACT

An adjustable angle spotlight structure is provided, which includes a lamp housing and a base, a plurality of through-holes are provided on a bottom side of the lamp housing, a circular sliding groove is provided on the lamp housing; a top of the base is fixedly provided with a lamp bead member, one side of the base is provided with locking posts; one side of the lamp bead member is extended to form a first stop edge, and a second stop edge is provided on an inner wall of the lamp housing, thereby forming a closed space with a built-in spring member. When adjusting, the base is pressed to disengage the locking posts from the through-holes and enter the sliding groove, the base is rotated to drive an optical lens to rotate, and the locking posts are slid to a target through-hole position, thereby achieving beam angle switching.

10 Claims, 9 Drawing Sheets

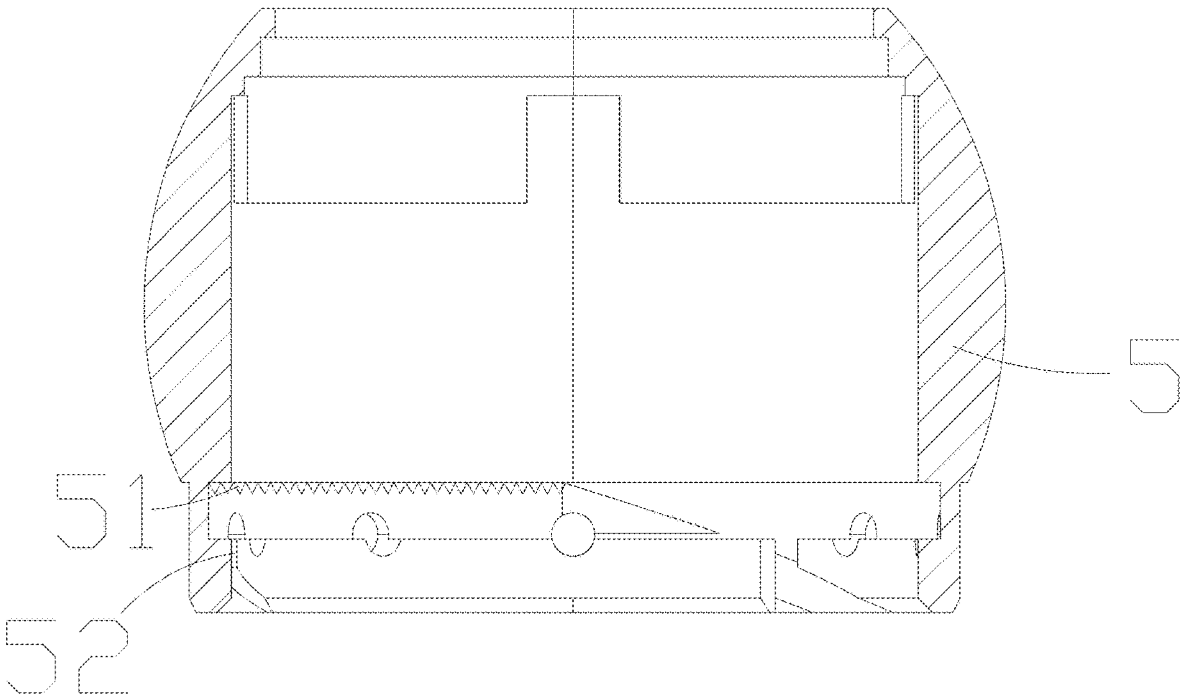
FIG. 9 (New)

ADJUSTABLE ANGLE SPOTLIGHT STRUCTURE

TECHNICAL FIELD

The present disclosure relates to the field of lighting devices technologies, and in particular, to a new type of adjustable angle spotlight structure.

BACKGROUND

At present, commonly used adjustable angle spotlights achieve angle adjustment through damping rotation or threaded locking structures. However, these schemes generally have the following issues.

Lack of feedback mechanism: users cannot perceive whether the adjustment is accurate and in place, which can easily lead to angle deviation and require repeated calibration.

Complicated operation: the thread locking method requires manual tightening of screws, which is inefficient and tool dependent.

SUMMARY

Given the above situation, it is necessary to provide an adjustable angle spotlight structure that solves at least one of the above problems, including a lamp housing and a base; a plurality of through-holes are uniformly provided at a bottom side of the lamp housing, an inner wall of the bottom of the lamp housing is provided with three sliding grooves along a circumferential direction, and the sliding grooves penetrate through the through-holes; a top end face of the base is fixedly provided with a lamp bead member, and a top side face of the base is uniformly provided with locking posts that match shapes of the through-holes; one side of the lamp bead member is extended outward to form a first stop edge, an inner wall of the lamp housing is extended inwardly to form a second stop edge; the first stop edge and the second stop edge form a closed space, and a spring member is provided in the closed space; the locking posts are detached from the through-holes and enter the sliding grooves by pressing the base, and the spring member provides a restoring force to allow the locking posts to be re clamped into the through-holes.

In some embodiments of the present disclosure, an outer wall of the lamp housing is an arc-shaped curved surface.

In some embodiments of the present disclosure, the adjustable angle spotlight structure further includes a lamp sleeve, where an inner wall of the lamp sleeve is provided with an arc-shaped recess that matches a shape of an outer wall of the lamp housing, the lamp housing is rotated around an axis of the arc-shaped recess to adjust an angle.

In some embodiments of the present disclosure, the adjustable angle spotlight structure further includes an annular locking member, and the annular locking member is threaded connected to a bottom of the lamp sleeve, a diameter of the annular locking member is smaller than a maximum diameter of the lamp housing to limit a displacement of the lamp housing.

In some embodiments of the present disclosure, the spring member is a compression spring, one end of the spring member abuts against the first stop edge and the other end of the spring member abuts against the second stop edge.

In some embodiments of the present disclosure, an inner wall of the annular locking member is provided with anti-slip teeth and rubber rings.

In some embodiments of the present disclosure, the through-holes are one of rectangular holes or circular holes, and cross-sectional shapes of the locking posts match the through-holes and the sliding grooves.

In some embodiments of the present disclosure, the lamp bead member includes an optical lens and a circular pressing ring, the optical lens is fixedly provided on the base, and the circular pressing ring is sleeved on the optical lens.

In some embodiments of the present disclosure, an inner side of the lamp housing is provided with the three sliding grooves that are vertically arranged, and the three sliding grooves are communicated through a straight channel.

In some embodiments of the present disclosure, the base and one side of the lamp housing are both provided with an identification part.

BRIEF DESCRIPTION OF DRAWINGS

FIG. 9 is a schematic diagram of an annular locking member according to an embodiment of the present disclosure.

DESCRIPTION OF EMBODIMENTS

In order to further clarify the purpose, technical solution, and advantages of the present disclosure, the following will provide a detailed explanation of an adjustable angle spotlight structure of the present disclosure in combination with the accompanying drawings and embodiments. It should be noted that specific embodiments described herein are only for explaining the present disclosure and are not intended to limit the present disclosure.

In the description of the present disclosure, unless otherwise specified, "a plurality of" means two or more. Terms "center", "vertical", "horizontal", "up", "down", "left", "right", "inside", "outside", "front end", "rear end", "head-end", "tail-end", "vertical", "horizontal", "top", "bottom", "inside", "outside" and other directional or positional relationships indicated are based on directional or positional relationships shown in the accompanying drawings and are only for a convenience of describing the present disclosure and simplifying the description, and do not indicate or imply that the device or element referred to must have a specific orientation, be constructed and operated in a specific orientation, and therefore cannot be understood as limiting the present disclosure. Furthermore, terms "first", "second", "third", etc. are only used for a descriptive purpose and cannot be understood as indicating or implying relative importance.

In the description of the present disclosure, it should be noted that unless otherwise specified and limited, terms "installation", "connection to", and "connection with" should be broadly understood, for example, it can be a fixed connection, a detachable connection, or an integral connection; it can be a mechanical connection or an electrical connection; it can be directly connected, indirectly connected through an intermediate medium, or connected internally between two components. For those skilled in the art, specific meanings of the above terms in this specification can be understood through specific situations.

Figure 1:
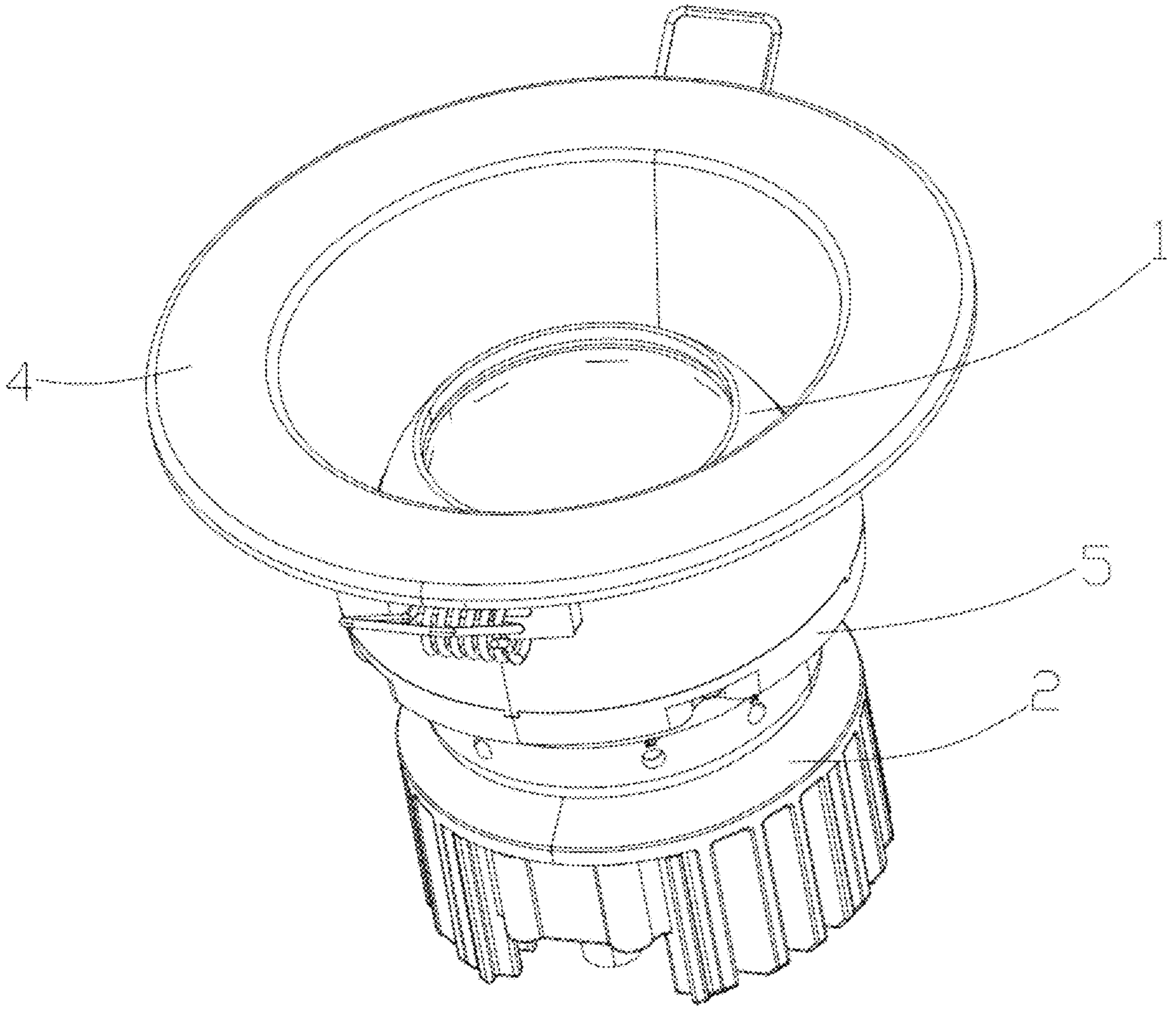
FIG. 1 is a schematic structural diagram of an adjustable angle spotlight according to an embodiment of the present disclosure.
Figure 2:
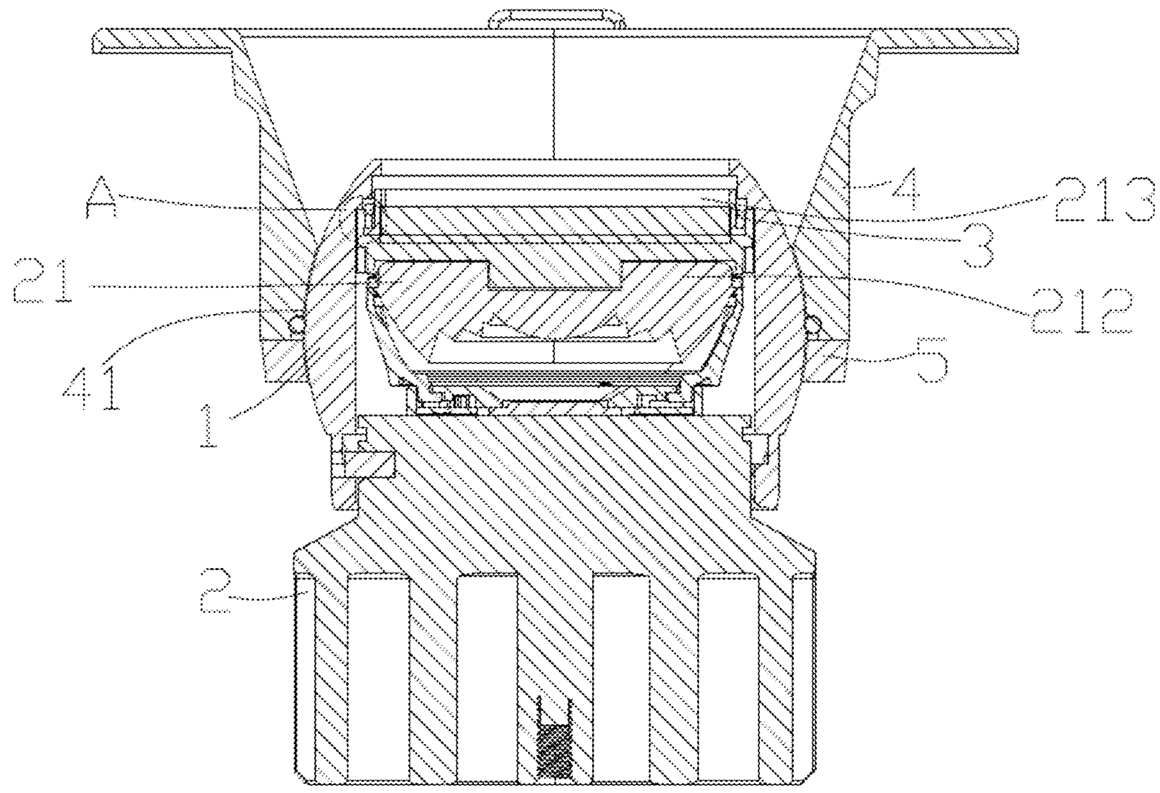
FIG. 2 is a cross-sectional view of the adjustable angle spotlight structure according to an embodiment of the present disclosure.
Figure 3:
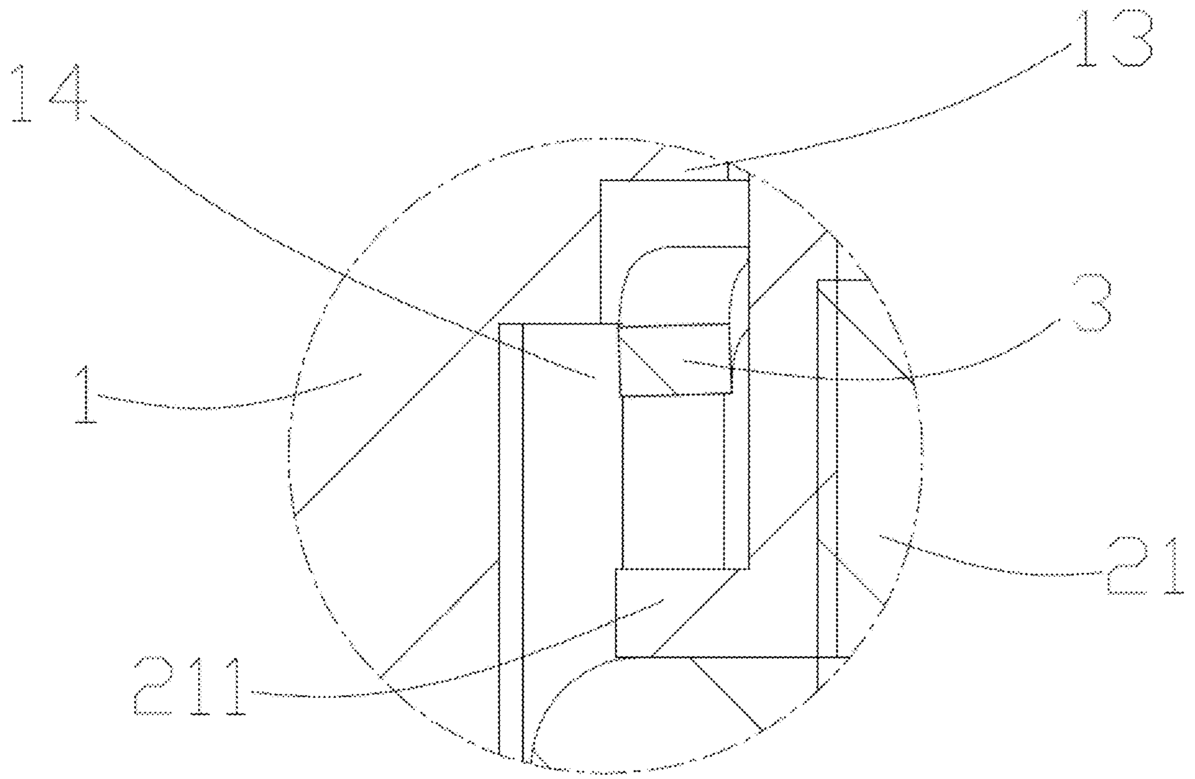
FIG. 3 is an enlarged view of A in FIG. 2.
Figure 4:
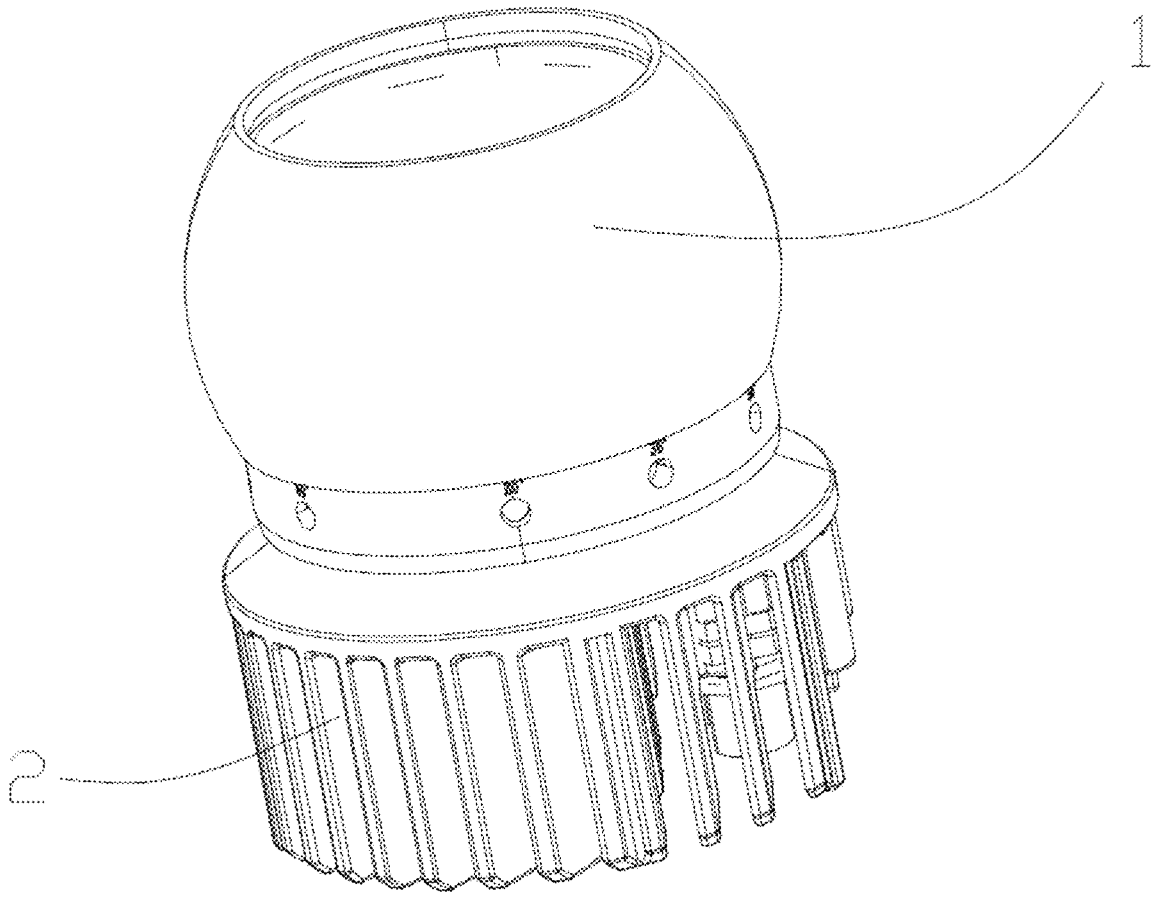
FIG. 4 is a schematic structural diagram of a lamp housing provided on a base according to an embodiment of the present disclosure.
Figure 5:
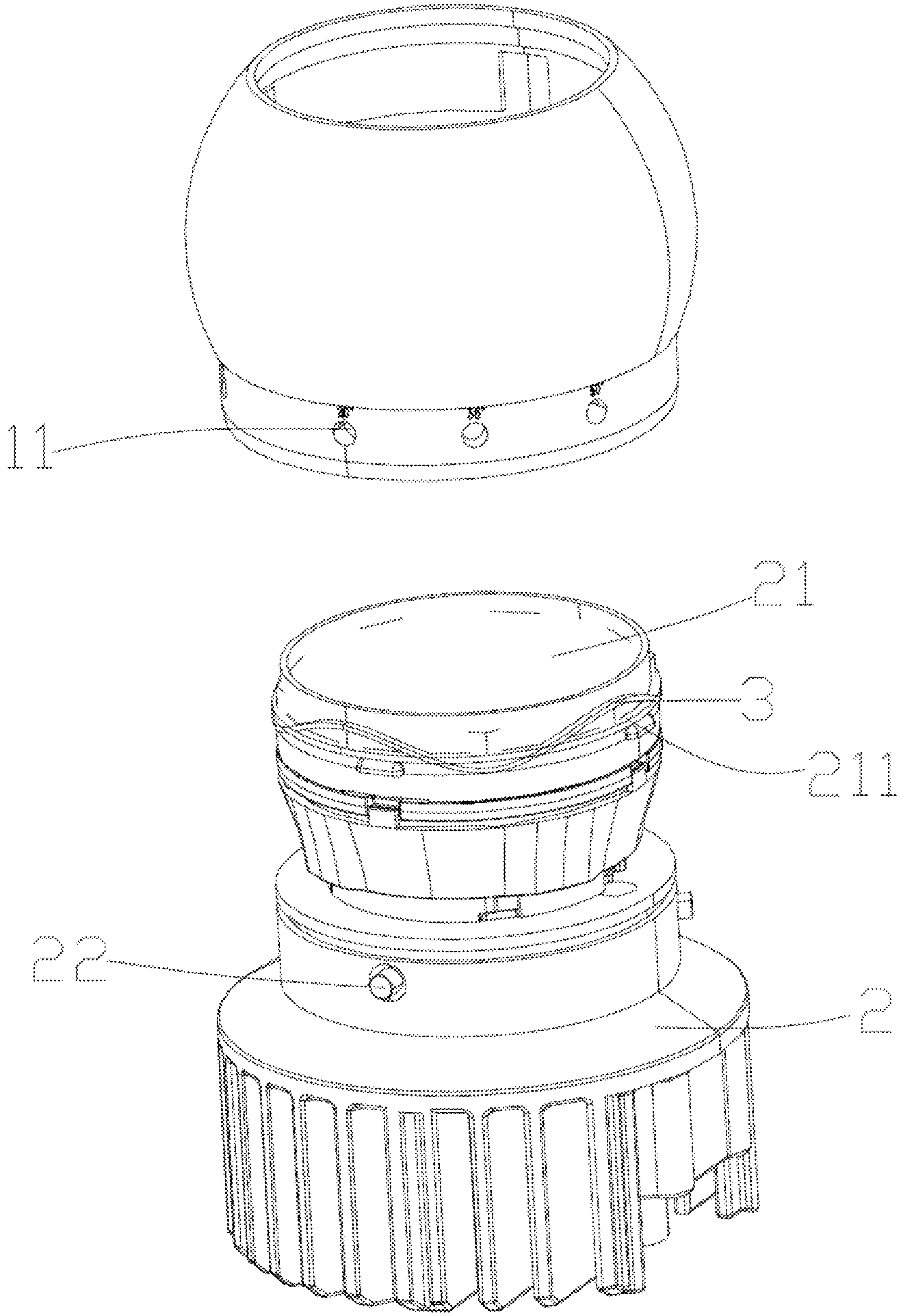
FIG. 5 is an exploded view of the lamp housing and base according to an embodiment of the present disclosure.
Figure 6:
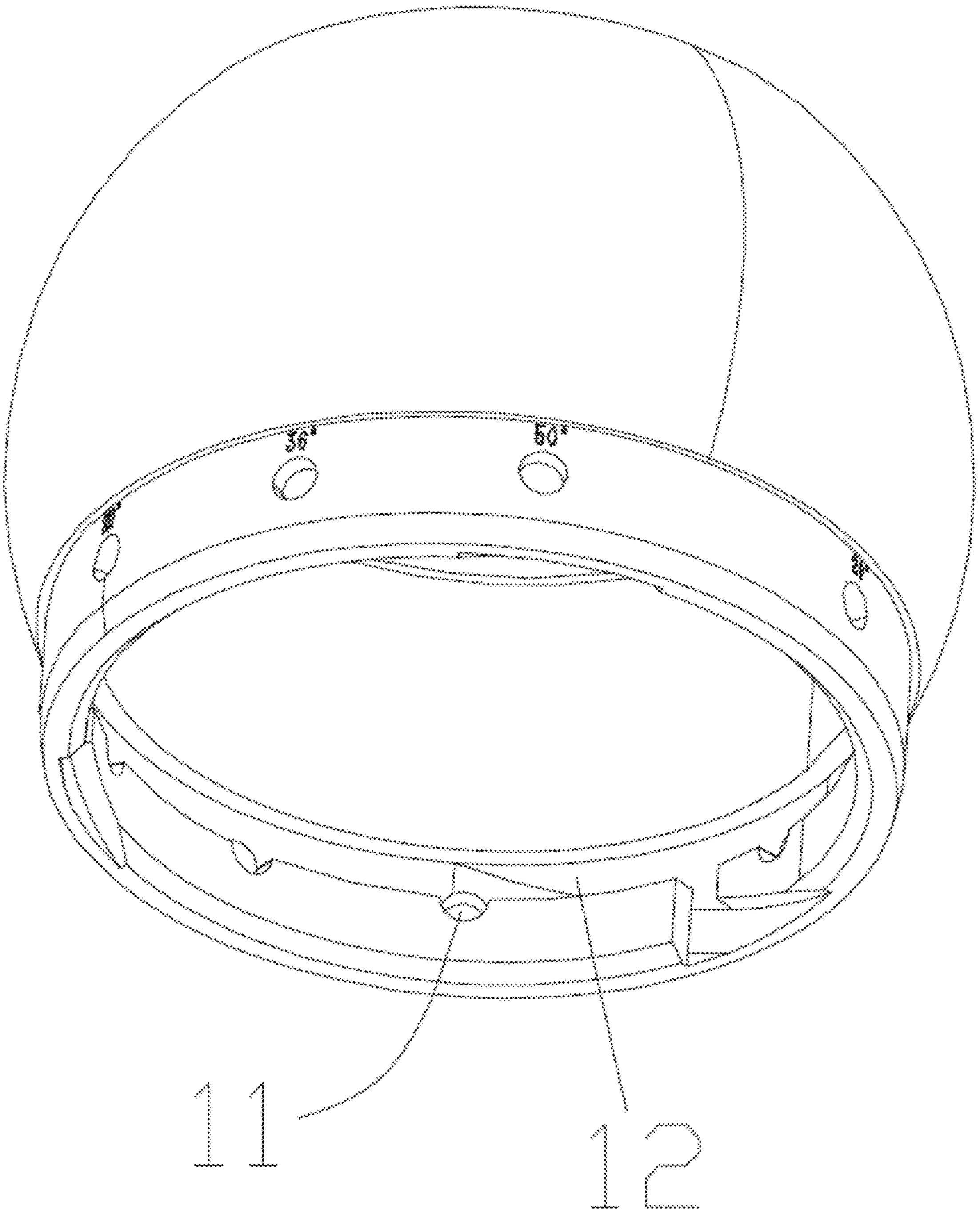
FIG. 6 is a schematic diagram of an internal structure of the lamp housing according to an embodiment of the present disclosure.

Please refer to FIGS. 1 to 6. An adjustable angle spotlight structure according to an embodiment of the present disclosure includes a lamp housing 1 and a base 2; a bottom side of the lamp housing 1 is uniformly provided with a plurality of through-holes 11, and an inner wall of the bottom of the lamp housing 1 is provided with three sliding grooves 12 along a circumferential direction, and the sliding grooves 12 penetrate through the through-holes 11; a top end face of the base 2 is fixedly provided with a lamp bead member 21, and a top side of the base 2 is uniformly provided with locking posts 22 that match shapes of the through-holes 11; one side of the lamp bead member 21 is extended outward to form a first stop edge 211, and an inner wall of the lamp housing 1 is extended inwardly to form with a second stop edge 13. The first stop edge 211 and the second stop edge 13 form a closed space 14, and a spring member 3 is provided in the closed space 14. The locking posts 22 can be detached from the through-holes 11 and enter the sliding grooves 12 by pressing the base 2, and the spring member 3 provides a restoring force to allow the locking posts 22 to be re inserted into the through-holes 11.

The through-holes 11 and the sliding grooves 12 of the lamp housing 1 form a movement path of the locking posts 22: the through-holes 11 is fixed positions of the locking posts 22, and the sliding grooves 12 is a continuous transition path during rotation.

When pressing the base 2, the lamp bead member 21 is moved up together with the base 2, and the locking posts 22 come out of the through-holes 11 and enter the sliding grooves 12. The first stop edge 211 compresses the spring member 3 to store energy.

The base 2 is rotated to drive the lamp bead member 21 and the locking posts 22 to slide along the sliding grooves 12. When the locking posts 22 are aligned with target through-holes 11, the spring member 3 pushes the locking posts 22 to re insert into the through-holes 11, thereby producing a "click" sound and a jerky feel. During an adjustment process, each gear has a clear mechanical feedback to avoid an angle deviation. The enclosed space design of the spring member 3 prevents dust from entering and causing jamming.

Please refer to FIGS. 1 to 6. In an implementation mode, an outer wall of the lamp housing 1 is an arc-shaped curved surface, and the adjustable angle spotlight structure further includes a lamp sleeve 4. An inner wall of the lamp sleeve 4 is provided with an arc-shaped recess 41 that matches a shape of an outer wall of the lamp housing 1. The lamp housing 1 can rotate around an axis of the arc-shaped recess 41 to adjust an angle.

The arc-shaped outer wall of the lamp housing 1 adopts a curved surface design (such as a circular arc with a central angle of 60°), and its curvature matches the arc-shaped recess 41 of the lamp sleeve 4, thereby forming a slidable curved surface.

The arc-shaped recess 41 of the lamp sleeve 4: an inner wall of the lamp sleeve 4 is provided with the arc-shaped recess 41 that is consistent with a curvature of the outer wall of the lamp housing 1, allowing the lamp housing 1 to adjust a pitch angle along an axis of the arc-shaped recess 41 (such as a horizontal axis).

Adjustment Process

1. After embedding the lamp housing 1 into the arc-shaped recess 41 of the lamp sleeve 4, the locking posts 22 are released by pressing the base 2.

2. A user holds the lamp housing 1 and rotates it in a direction of the arc-shaped recess 41 to change the pitch angle of the spotlight (such as within a range of 0°-5°).

3. After releasing the base 2, the locking posts 22 and the through-holes 11 are re-locked.

The arc-shaped lamp housing 1 is matched with the recess of the lamp sleeve 4 to achieve a wide range of pitch angle adjustment (traditional spotlights usually only support horizontal rotation), and the sliding secondary structure has no gap shaking.

Please refer to FIGS. 1 to 6. In an implementation mode, the adjustable angle spotlight structure further includes an annular locking member 5, and the annular locking member 5 is threaded connected to a bottom of the lamp sleeve 4. A diameter of the annular locking member 5 is smaller than a maximum diameter of the lamp housing 1 to limit a displacement of the lamp housing 1.

The annular locking member 5 is matched with a bottom external thread of the lamp sleeve 4 through internal threads, and rotating the annular locking member 5 can cause the annular locking member 5 to move up and down along the lamp sleeve 4.

When the annular locking member 5 is tightened, the top inner edge of the annular locking member 5 abuts against a bottom outer wall of the lamp housing 1. As an inner diameter of the annular locking member 5 is slightly smaller than a maximum outer diameter of the lamp housing 1, a circumferential pressure is formed to constrain the displacement of the lamp housing 1. Eliminating a gap between the lamp housing 1 and the lamp sleeve 4 by pre-tightening the threads to prevent an angular displacement caused by vibration.

Please refer to FIGS. 1 to 6. In an implementation mode, the spring member 3 is a compression spring, one end of the spring member 3 abuts against the first stop edge 211 and the other end of the spring member 3 abuts against the second stop edge 13.

After the compression spring is installed in the enclosed space 14, two ends are pressed tightly against the first stop edge 211 and the second stop edge 13, and an axial compression direction is consistent with a movement direction of the locking posts 22 to ensure an efficiency of force transmission.

Figure 7:
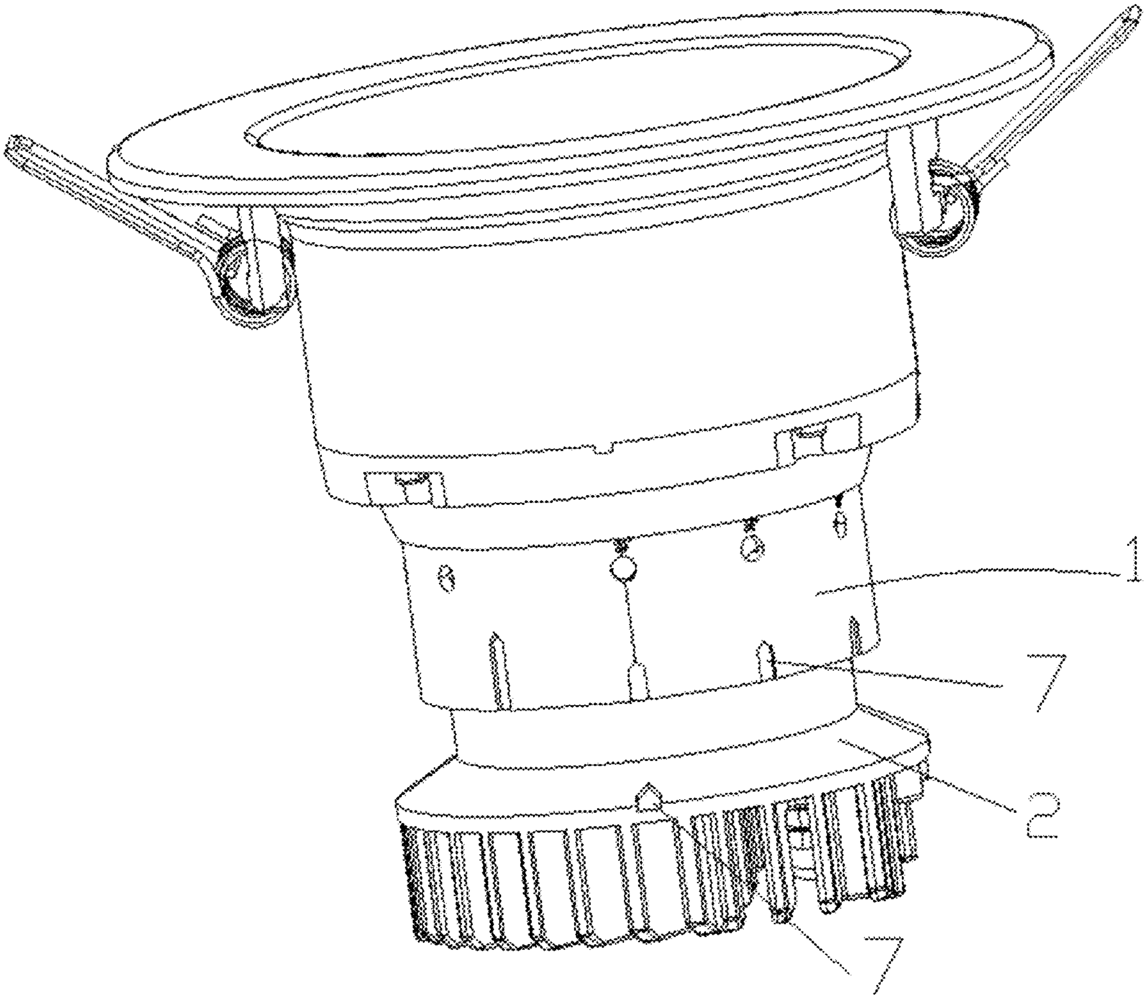
FIG. 7 is a schematic structural diagram of an identification part in an embodiment of the present disclosure.
Figure 8:
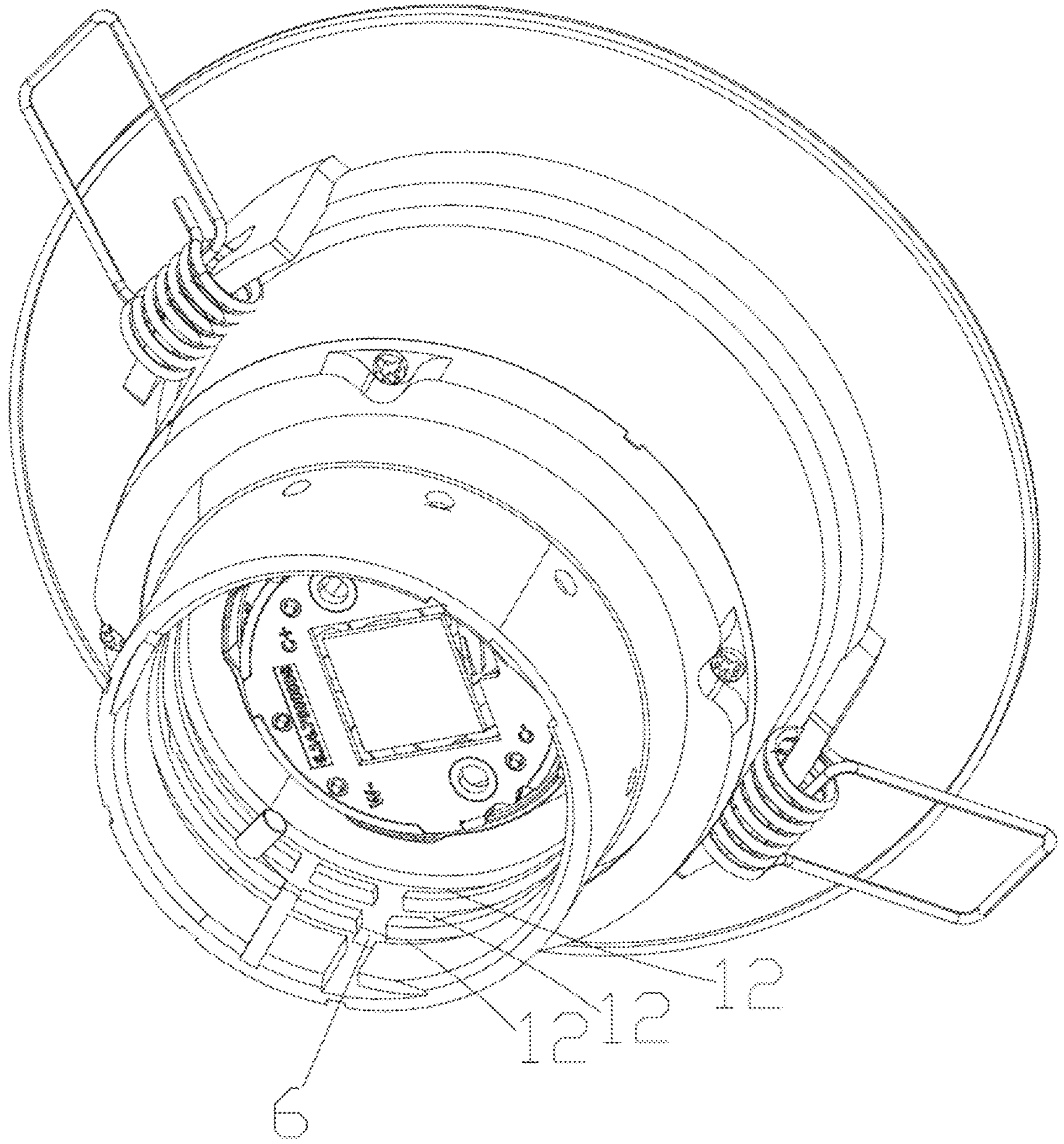
FIG. 8 is a schematic diagram of an internal structure of the lamp housing according to an embodiment of the present disclosure.

Please refer to FIGS. 1 to 9. In an implementation mode, an inner wall of the annular locking member 5 is provided with anti-slip teeth 51 and rubber rings 52.

The tooth pattern (such as triangular sawtooth pattern) on an inner wall of the annular locking member 5 increases a friction with the lamp housing 1. Even if the thread loosens due to vibration, the tooth pattern can still temporarily clamp the lamp housing 1, and the rubber ring can enhance its sealing performance.

Please refer to FIGS. 1 to 6. In an implementation mode, the through-holes 11 are rectangular holes or circular holes, and cross-sections of the locking posts 22 match the through-holes 11 and the sliding grooves 12.

Design Selection

Rectangular holes: suitable for injection molded lamp housing 1, the rectangular side wall can limit circumferential rotations of the locking posts 22.

Circular holes: suitable for metal stamping process, which reduces processing difficulty.

Please refer to FIGS. 1 to 8. In an implementation mode, the lamp bead member 21 includes an optical lens 212 and a circular pressing ring 213. The optical lens 212 is fixedly provided on the base 2, and the circular pressure ring 213 is sleeved on the optical lens 212. An inner side surface of the lamp housing 1 is further provided with three sliding grooves 12 that are vertically arranged, and the three sliding grooves 12 are communicated through a straight channel 6. The base 2 and one side of the lamp housing 1 are both provided with an identification part 7.

After the optical lens 212 is centered during installation, the circular pressing ring 213 provides a circumferential locking force to avoid lens displacement. The function of the sliding grooves 12 is to adapt to a size of the optical lens 212. For example, when a lens with a relatively large size is provided in the lamp housing, two sides of the optical lens 212 are embedded in an upper circular channel, a shorter optical lens is inserted into a lowest sliding groove 12, and a moderate optical lens 212 is inserted into a middle sliding groove 12. There are a plurality of identification parts 7 on the lamp housing 1, corresponding to the through-holes 11 and straight channels 6 of the base 2. When the identification part 7 on the base 2 is rotated to the identification part 7 corresponding to the through-holes 11, an angle of the adjustable lamp bundle can be adjusted. When the identification part 7 on the base 2 is rotated to the identification part 7 corresponding to the straight channel 6, the two sides of the optical lens 212 are convex and enter the straight channel 6, so that the optical lens 212 can detach from the lamp housing 1.

The above description is only the preferred embodiment of the present disclosure and does not limit the present disclosure in any form. Although the present disclosure has been disclosed in the preferred embodiment, it is not intended to limit the present disclosure. Any skilled person in the art who is familiar with this field can use the disclosed technical content to make minor changes or modifications to equivalent embodiments without departing from the scope of the technical solution of the present disclosure. Any minor modifications, equivalent changes, and modifications made to the above embodiments based on the technical essence of the present disclosure without departing from the technical solution of the present disclosure still belong to the scope of the technical solution of the present disclosure.

What is claimed is:

1. An adjustable angle spotlight structure, comprising a lamp housing and a base;

a plurality of through-holes are uniformly provided at a bottom side of the lamp housing, an inner wall of the bottom of the lamp housing is provided with three sliding grooves along a circumferential direction, and the three sliding grooves penetrate through the through-holes;

a top end face of the base is fixedly provided with a lamp bead member, and a top side face of the base is uniformly provided with locking posts that match shapes of the through-holes;

one side of the lamp bead member is extended outward to form a first stop edge, an inner wall of the lamp housing is extended inwardly to form a second stop edge;

the first stop edge and the second stop edge form a closed space, and a spring member is provided in the closed space;

the locking posts are detached from the through-holes and enter the three sliding grooves by pressing the base, and the spring member provides a restoring force to allow the locking posts to be re clamped into the through-holes.

2. The adjustable angle spotlight structure according to claim 1, wherein an outer wall of the lamp housing is an arc-shaped curved surface.

3. The adjustable angle spotlight structure according to claim 2, further comprises a lamp sleeve, wherein an inner wall of the lamp sleeve is provided with an arc-shaped recess that matches a shape of an outer wall of the lamp housing, the lamp housing is rotated around an axis of the arc-shaped recess to adjust an angle.

4. The adjustable angle spotlight structure according to claim 3, further comprises an annular locking member, and the annular locking member is threaded connected to a bottom of the lamp sleeve, a diameter of the annular locking member is smaller than a maximum diameter of the lamp housing to limit a displacement of the lamp housing.

5. The adjustable angle spotlight structure according to claim 1, wherein the spring member is a compression spring, one end of the spring member abuts against the first stop edge and the other end of the spring member abuts against the second stop edge.

6. The adjustable angle spotlight structure according to claim 4, wherein an inner wall of the annular locking member is provided with anti-slip teeth and rubber rings.

7. The adjustable angle spotlight structure according to claim 1, wherein the through-holes are one of rectangular holes or circular holes, and cross-sectional shapes of the locking posts match the through-holes and the three sliding grooves.

8. The adjustable angle spotlight structure according to claim 1, wherein the lamp bead member comprises an optical lens and a circular pressing ring, the optical lens is fixedly provided on the base, and the circular pressing ring is sleeved on the optical lens.

9. The adjustable angle spotlight structure according to claim 8, wherein an inner side of the lamp housing is provided with the three sliding grooves that are vertically arranged, and the three sliding grooves are communicated through a straight channel.

10. The adjustable angle spotlight structure according to claim 1, wherein the base and one side of the lamp housing are both provided with an identification part.

* * * * *